United States Patent [19]

Marvonek et al.

[11] Patent Number: 5,794,654
[45] Date of Patent: Aug. 18, 1998

[54] REED VALVE APPARATUS

[76] Inventors: Michael F. Marvonek; Patricia Marvonek, both of P.O. Box 232, Stafford Springs, Conn. 06076

[21] Appl. No.: 598,510

[22] Filed: Feb. 8, 1996

[51] Int. Cl.⁶ .................................................. F16K 15/00
[52] U.S. Cl. .................. 137/512.15; 137/855; 137/512.2
[58] Field of Search .................. 137/855, 493.8, 137/493.1, 512.15, 512.2, 512.4; 123/73 R

[56] References Cited

FOREIGN PATENT DOCUMENTS 257670 12/1970 Russian Federation .......... 137/512.15

*Primary Examiner*—Denise L. Ferensic
*Assistant Examiner*—Ramyar Farid
*Attorney, Agent, or Firm*—Robert S. Smith

[57] ABSTRACT

A reed for use in a reed valve which includes a resilient planar member having a first edge portion by which the member may be attached to an associated reed cage and an opposed second edge portion. The reed includes a generally arch shaped cut in the member defining in the member spaced hinges extending generally intermediate the first and second edge portions on each side of the arch shaped cut and also defining a portion within the member that opens upon bending of the member intermediate the first side and the second side. In some forms of the invention the generally arch shaped cut has two ends and the two ends are closer to the second edge portion than the remainder of the generally arch shaped cut. Some embodiments of the invention may have a plurality of additional generally arch shaped cuts disposed therein. Each of the generally arch shaped cuts has two ends and the two ends of each generally arch shaped cut are disposed closer to the second edge portion than the remainder of the generally arch shaped cut. Each of the arch shaped cuts may have substantially the same dimensions and all may have two ends that intersect a common imaginary line. The member may have a slot extending generally from the second edge portion toward the first edge portion intermediate adjacent arch shaped cuts whereby discrete petals are defined.

11 Claims, 5 Drawing Sheets

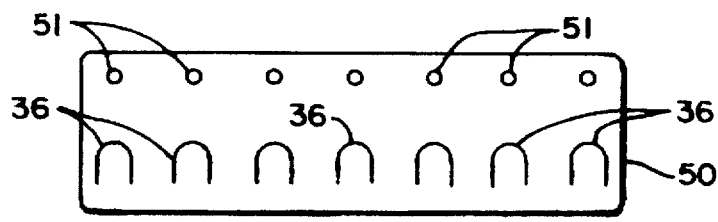
FIG. 4
   
FIG. 5a  FIG. 5b  FIG. 5c  FIG. 5d
   
FIG. 5e  FIG. 5f  FIG. 5g  FIG. 5h
   
FIG. 5i  FIG. 5j  FIG. 5k  FIG. 5l
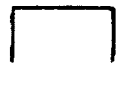  
FIG. 5m  FIG. 5n
  
FIG. 5o  FIG. 5p

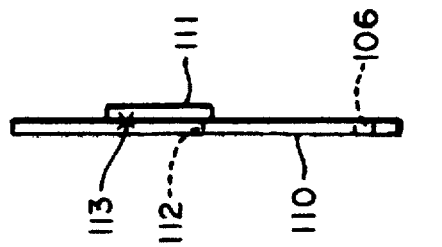
FIG. 14B
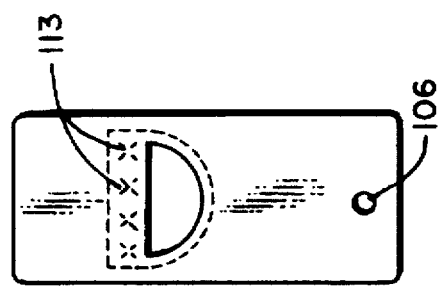
FIG. 14A
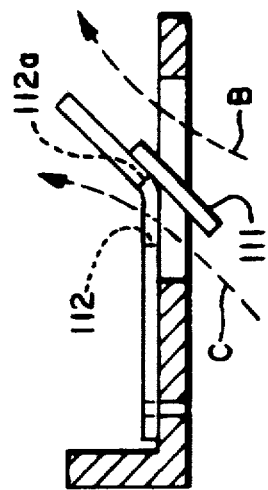
FIG. 15
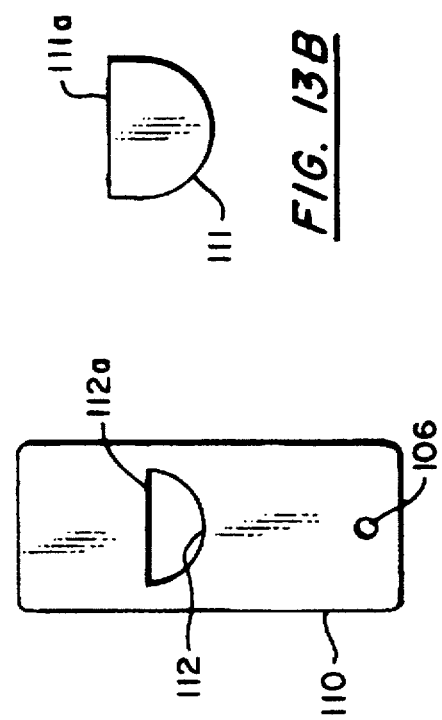
FIG. 13B
FIG. 13A
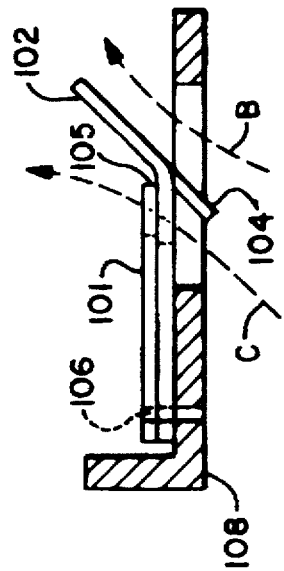
FIG. 12

REED VALVE APPARATUS

BACKGROUND OF THE INVENTION

The invention relates to valves and particularly to improved reed valve constructions. Such valves have particular application for intake ports of two stroke engines although they are also suitable for a wide variety of other applications.

The reed valve is a particular kind of check valve. Early prior art reed valve constructions have utilized petal members that, at least in some cases, were each a single thickness of flexible material that flexed to allow passage of a fluid in a first direction and prevent flow in the opposite direction. More specifically, flow in the opposite direction causes the reed or petal member to seat on a reed cage and thus blocks fluid flow.

Later prior art constructions have used two discrete layers and are referred to as two stage valves. One such construction is shown in U.S. Pat. No. 4,051,820. Two stage valves typically have a primary relatively thick reed that seats in face to face engagement with a planar surface on the reed cage. The primary reed is provided with a port. This port is smaller than the port in the reed cage that is covered by the primary reed. A secondary reed covers the port in the primary reed when no flow is passing through the valve.

Dual-stage reeds are also well known in the prior art. Perhaps the most pertinent of these to the present invention is the design typified in U.S. Pat. No. 4,051,820 to Boyesen. In this patent a primary relatively thick reed overlies a port in a valve body with substantially its entire perimeter in contact with the valve seat. The primary reed has a port therein which is of a size smaller than the port in the housing. This primary reed port is controlled by a secondary reed which covers it, is smaller in area and is more flexible than the primary reed. This greater flexibility is achieved by using a thinner material for the secondary reed than for the primary reed, both of which are constructed with similar materials.

The dual-stage reed constructions typified by the constructions of U.S. Pat. No. 4,051,820 have the disadvantages of a relatively high spring rate in the hinge area resulting in undesirably high forces needed to lift the reed from the valve body to open the port therein. In addition, the secondary reed tends to mask flow through the port of the primary reed as that flow can only occur along the periphery of the secondary reed.

U.S. Pat. No. 5,143,027 discloses still another form of two stage valve. The focus of that invention is on providing proper movement of the primary and secondary reeds that cover each port in the reed cage.

SUMMARY OF THE INVENTION

It is an object of the present invention to provide a reed construction that will require only a single thickness of material and which will provide relatively high flow and thereby provided increased power output from engines incorporating such reed valves.

It is another object of the invention to provide a reed member construction that will be much more simple to construct than other valves having the capacity of the valve described herein.

Still another object of the invention is to provide a single thickness of reed to seal each port in the reed cage.

Yet another object of the invention is to provide a single thickness of reed that will initially deflect to allow a given flow around the periphery of the reed and that will upon still further deflection open a passageway or passageways in the face of the reed to allow still more flow.

It has now been found that these and other objects of the invention may be attained in a reed for use in a reed valve which includes a resilient planar member having a first edge portion by which the member may be attached to an associated reed cage and an opposed second edge portion. The reed includes a generally arch shaped cut in the member defining in the member spaced hinges extending generally intermediate the first and second edge portions on each side of the arch shaped cut and also defining a portion within the member that opens upon bending of the member intermediate the first side and the second side.

In some forms of the invention the generally arch shaped cut has two ends and the two ends are closer to the first edge portion than the remainder of the generally arch shaped cut. Some embodiments of the invention may have a plurality of additional generally arch shaped cuts disposed therein. Each of the generally arch shaped cuts has two ends and the two ends of each generally arch shaped cut are disposed closer to the first edge portion than the remainder of the generally arch shaped cut. Each of the arch shaped cuts may have substantially the same dimensions and all may have two ends that intersect a common imaginary line. The member may have a slot extending generally from the second edge portion toward the first edge portion intermediate adjacent arch shaped cuts whereby discrete petals are defined.

In some forms of the invention a reed member for use with an associated reed cage in an associated reed valve includes a resilient flat member having a base end portion and a free end portion and the member has at least one arch shaped cut therein. The arch shaped cut includes first and second edge portions each having free ends and other ends. The other ends are joined by an arch part of the cut and the sides are disposed in substantially perpendicular relationship to the base end portion with the arch part being disposed further away from the base end portion than the free ends of the first and second edge portions.

Some forms of this embodiment may have a member that is elongated and the base end portion and the free end portion are disposed at the ends thereof. The reed member may includes a plurality of petals of this type.

BRIEF DESCRIPTION OF THE DRAWING

The invention will be better understood by reference to the drawing in which:

FIG. 4 is a plan view of a petal member in accordance with a second embodiment of the present invention.

FIGS. 5(a)–5(p) are diagrammatic views of various cuts that may be used in the individual petal members illustrated in FIGS. 3 and 4.

3

Figure 3:
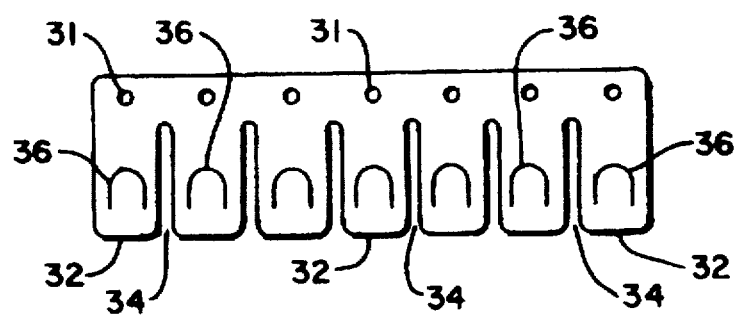
FIG. 3 and 3A are a plan view of petal member in accordance with a first embodiment of the present invention.
Figure 8:
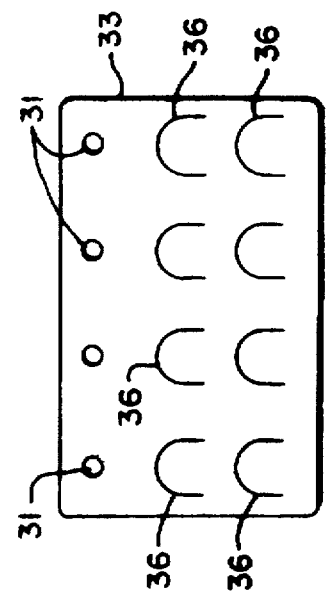

FIG. 8 is a view, similar to the view of FIG. 3, illustrating still another embodiment of the invention.

Figure 9:
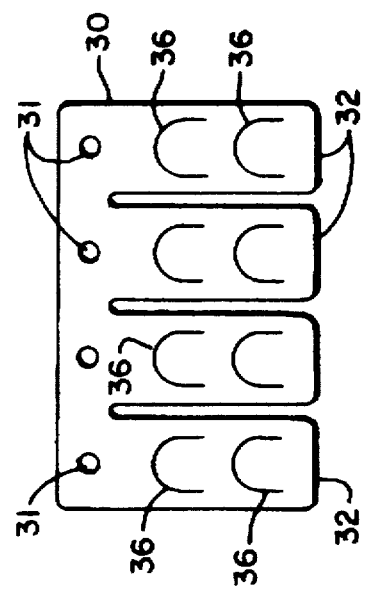

FIG. 9 is a view, similar to FIG. 4, illustrating still another embodiment of the invention.

Figure 10A:
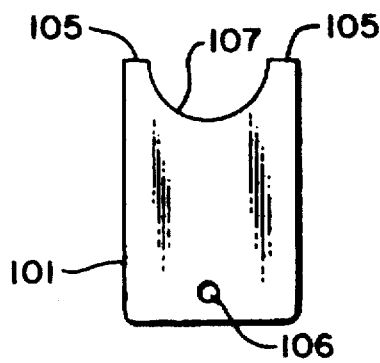

FIG. 10A is a plan view of a first petal that is a part of still another embodiment of the invention.

Figure 10B:
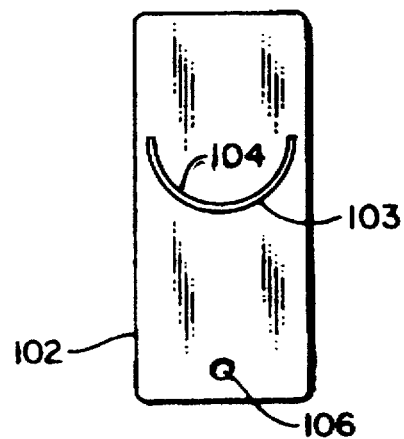

FIG. 10B is a plan view of a second petal that is a part of the same embodiment as the petal illustrated in FIG. 10A.

Figure 11A:
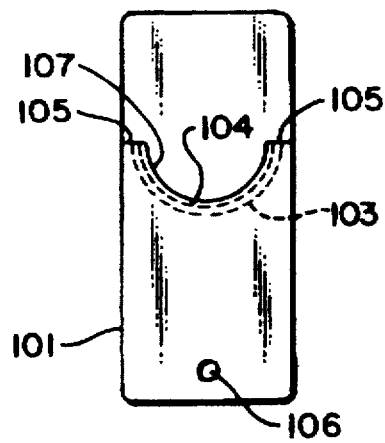
Figure 11B:
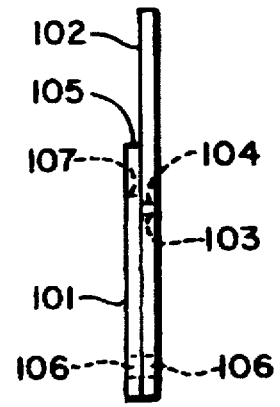

FIGS. 11A and 11B are respectively plan and side views of the cooperating petals illustrated in FIGS. 10A and 10B.

FIG. 12 is a side view illustrating the manner of operation of the embodiment of FIGS. 10A through 11B.

FIG. 13A is a plan view of a first petal that is a part of still another embodiment of the invention.

FIG. 13B is a plan view of a second petal that is a part of the same embodiment as the petal illustrated in FIG. 13A.

FIGS. 14A and 14B are respectively plan and side views of the cooperating petals illustrated in FIGS. 13A and 13B.

FIG. 15 is a side view illustrating the manner of operation the embodiment of FIGS. 13A through 14B.

DESCRIPTION OF THE PREFERRED EMBODIMENTS OF THE INVENTION

Figure 1:
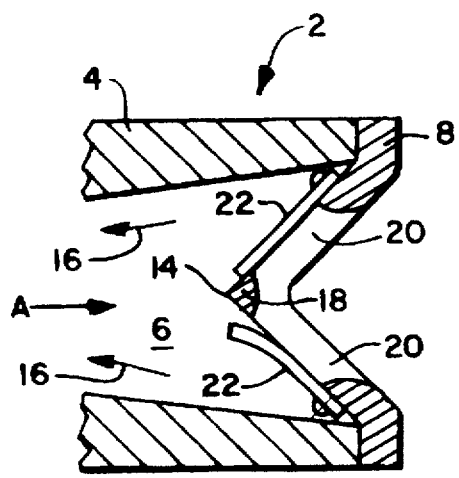
FIG. 1 is a partially schematic cross-section view of a prior art reed valve assembly in an intake of a two stroke internal combustion engine.
Figure 2:
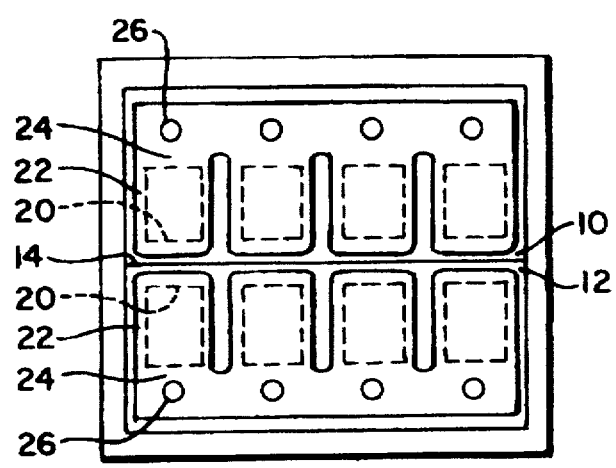
FIG. 2 is an elevation taken in the direction of the arrow in FIG. 1 with the intake manifold eliminated.

Referring now to FIGS. 1 and 2 which diagrammatically illustrates a typical example of a prior art reed valve construction to control flow through the intake port of a two stroke internal combustion engine. A valve assembly 2 is received in a housing 4 defining an intake duct or port 6 of the engine. The valve assembly 2 has a valve body 8 having convergent faces 10 and 12 joined at an apex or line 14 facing the intake port which lies in the direction of arrow 16, the apex being formed by a transverse member 18.

In the illustrated structure each convergent face 10, 12 defines four ports 20 (shown in dashed line). The ports 20 on each face 10,12 are closed by a resilient reed 22. Each reed 22, in the illustrated embodiment of the invention, has four petals. All of the petals in each reed 22 are interconnected at the base 24 thereof. The reeds 22 are attached to the valve assembly by screws 26 with the interconnection or base 24 of the reeds 22, 22 serving to align the reeds with their associated ports without inhibiting their operation.

As best seen in FIG. 1, the reed 22 in the upper part of the drawing is shown closed while reed 22 in the lower part of the drawing is shown open to permit flow through its associated port. It will be appreciated that in normal operation the flexing of all of the reeds on both sides of the valve will always be substantially the same and the illustrated difference is merely to illustrate the different possible positions. In other words, the amount of flexing of the individual reeds or petals will depend substantially on the operating condition of the valve. It will be appreciated that there is no special significance to the choice of eight ports or to the exact symmetry of the valve body and its ports. Thus, other engines may have different size ports, different quantities of ports and other differences. In addition, there is no particular significance to the illustration of the prior art being based on a reed member having a plurality of petals as opposed to a plurality of completely separate reeds. The present features of the present invention may be adapted to such variations in engine construction.

Referring now to FIG. 3 there is shown a first embodiment of the present invention. A reed member 30 is provided with a plurality of petals which are each substantially planar and which are disposed in substantially coplanar relationship. The petals 32 are elongated and disposed in side by side relationship with an elongated slot 34 disposed intermediate a major axial art of the adjacent petals 32. Each petal 32 has a generally arch shaped cut 36 therein. Each arch shaped cut extends through the entire thickness of the petal 32 in which the cut 36 is disposed. In the preferred embodiment there is the single cut 36 in each petal 32 although there may be a plurality of such arch shaped cuts in other embodiments. Preferably, each arch shaped cut 36 has a form that may be described as first and second legs extending from an arch.

Figure 3A:
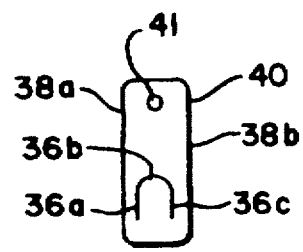

This will be better seen in FIG. 3A which illustrates a single petal 40 embodiment. The single petal 40 is elongated and has a base end that is mounted by a screw (not shown) that extends through a hole 41. This is similar to the FIG. 3 structure that has holes 31 extending through the base end of the reed member 30. That member 30 is secured by screws (not shown) extending through the holes 31 in the base end of the reed member 30. The preferred form of the cut includes a leg 36a and an opposed generally aligned leg 36c. The cut further includes an arch 36b that joins the legs 36a, 36c. Thus, the arch shaped cut will be understood to be "convex" with respect to the base end of the elongated petal and "concave" with respect to the free end of the petal.

Figure 6:
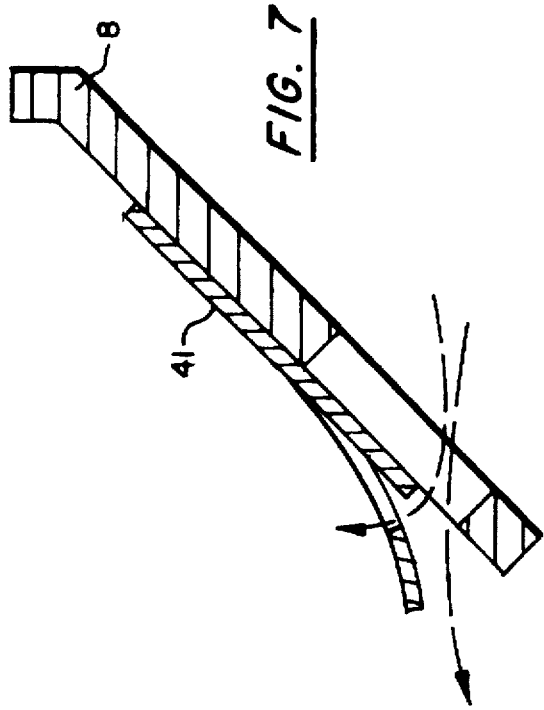
FIG. 6 is a fragmentary sectional view of a portion of a reed cage with a reed of the type illustrated in FIG. 3A installed thereon and which illustrates the effects of longitudinal bending.

In most forms of the present invention the petals are elongated and during normal operation bend about the longitudinal axis thereof, as best seen in FIG. 6, the petal 40 will bend so that the flap defined by the cut will tend to align itself with the flow indicated by the letter B. Most of the flow will pass under the free end of the petal 40 in the normal manner. A part however will flow through the opening defined by the sides 36a, 36c, and the arch 36b. The petals of the present invention provide more airflow than the petals of the prior art for two reasons.

Firstly, the definition of the spaced arms 38a and 38b causes the petal 40 to deflect more because the hinge area is substantially reduced. It will be understood that the arm 38a is defined in the longitudinally extending portion of the petal 40 intermediate the leg 36a and the adjacent side of the petal 40. Similarly, the leg 38b is longitudinally extending between the leg 36c and the longitudinally extending side of the petal 40 that is adjacent to the leg 36b.

Secondly, the increased airflow is achieved by the additional opening within the petal 40 as longitudinal bending opens the opening defined by the arch shaped cut which in the embodiment of FIG. 3A by the legs 36a and 36c and the arch 36b. Stated another way, the "flap" defined by the cut will not deflect in the same way as the arms 38a and 38b. This occurs because the fluid flow acting on the free end of the petal 40 will have a greater effect than the force produced on the shorter flap. Accordingly, there will be an opening within the petal produced by the differential bending of the petal 40 and the flap. This opening allows still more air to flow through the valve. The increased flow will increase the power produced by the engine in which the valve is installed.

The invention is not limited to discrete petals such as that shown in FIG. 3A and the reed member 30 shown in FIG. 3 that includes a plurality of laterally adjacent petals that are each integral parts of a common base. Referring now to FIG. 4 there is shown another embodiment of the invention in which a single rectangular reed member 50 is shown. The reed member 50 is suitable for installation on the same cage as the reed member 30 shown in FIG. 3. Accordingly, it includes a plurality of holes 51 along a base portion for mounting. A plurality of arch shaped cuts 56 extend through the member 50. It will be understood that the only difference between the embodiment of FIG. 3 and the embodiment of FIG. 4 is the presence of the slots 34 in the FIG. 3 embodiment.

Those skilled in the art will recognize that the bending and opening of a flap characteristics described in detail with respect to the embodiment of FIG. 3A will still occur in the embodiment of FIG. 4. This follows because the cuts 56 still reduce the cross-sectional area of the material the subjected to bending forces and the defined flap like openings still provide a secondary flow path.

The precise form of the cuts may be varied substantially. All are substantially arch shaped. This does not mean, however, that the form is limited to a section of a circle that has parallel spaced sides that are tangent to the circle. As best seen in FIGS. 5(a) through 5(p) the possible forms are quite varied.

Figure 7:
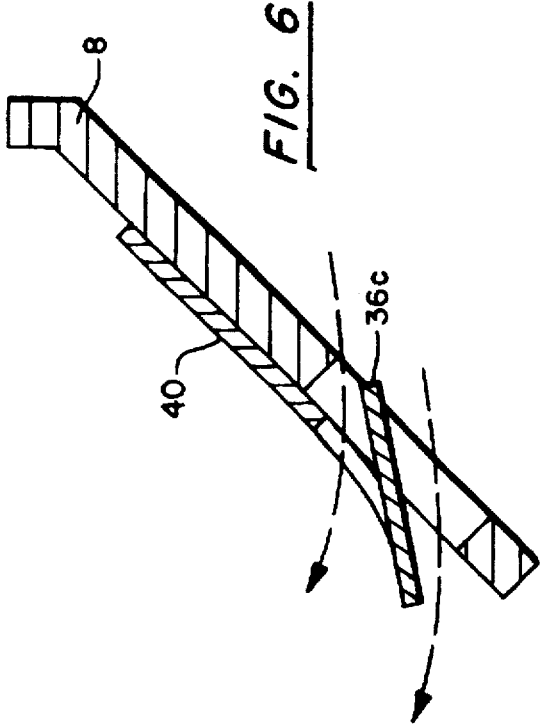
FIG. 7 is a view similar to FIG. 6 illustrating an alternate form of the reed member and illustrating the effects of longitudinal bending in this form of the invention.

A preferred form of the invention is the form shown in FIG. 6 in which the free ends of the sides 36a and 36c are closer to the free end of the petal 40 and the arch 36b. In other words, the base end of the petal 40 is closer to the arch 36b than to the free ends of the sides 36a and 36c. Although this is the preferred form it will be understood that the opposite geometric relationship in which the free ends of the cut are closest to the base of the petal is also within the scope of the invention. This form of the invention is illustrated in FIG. 7 which illustrates the flow paths when the petal 41 deflects.

Still other forms of the invention have multiple arcuate cuts therein. The cuts may extend in the same direction as illustrated in FIGS. 8 and 9. These drawings illustrate a reed member 30 and a reed member 33. These members are respectively a member having a plurality of laterally adjacent petals that are each integral parts of a common base and a member comprising only a single rectangular shape. Both types have holes 31 for mounting on an associated reed cage. The cuts 36 have their free ends nearer to the base end of the petal than to the free end thereof.

Referring now to FIGS. 10A, 10B, 11A, 11B, and 12 there is shown another embodiment of the invention. In this embodiment a shorter reed or petal 101 is elongated and has an arcuate axial extremity 107. The axial extremity 107 of the petal 101 may be characterized as concave since the arc extends for the base end of the petal 101. The radius of curvature of the arc is less one half the width of the petal 101. Accordingly, two legs 105, 105 are defined on the sides of the petal 101. The base end refers to the end which is secured to the reed cage 108 by a screw (not shown for clarity) that extends through a hole 106 in the axial extremity of the petal 101 that is remote from the arcuate axial extremity 107.

A petal 102 cooperates with the petal 101. The petal 102 is generally rectangular and elongated with a length longer the petal 101. The petal 102 has an arcuate slot 103 cut therein. Ordinarily, the slot 103 will have a width that is greater than the width of the cuts in the other embodiments. The petals 101 and 102 are positioned in planar face to planar face abutting relationship as shown in FIGS. 11A and 11B. The arcuate axial extremity of the petal 101 is dimensioned and configured to just overlap the slot 103.

As best seen in FIG. 12 air indicated by the curved arrow B flows against the free end of the petal 102. Because of the reinforcement of the petal 102 by the legs 105 the petal 102 will bend most at the tip of the legs 105 as shown in FIG. 12. This bending of the petal 102 with the arcuate axial extremity 107 and legs 105, 105 supporting the petal 102 contributes to the movement of the edge 104 of the slot 103 away from the petal 101. This movement opens up a flow have to the petal 102 as indicated by the dashed line arrow C. Thus, more air is able to reach the associated engine because of the dual flow paths to the engine. More specifically, the flow paths are indicated by the dashed arrows B and C.

Referring now to FIGS. 13A, 13B, 14A, 14B and 15 there is shown a generally rectangular petal 110 having a hole 112 intermediate the axial extremities of the petal 110. The whole has a straight side 112a and an arcuate side 112b. In the preferred embodiment the arcuate side 112b is closer to the base end and the mounting hole 106 than is the straight side 112a.

Fixed to the petal 110 is a flap 111 that is larger than the hole 112. The flap 111, in the preferred form, is fixed to the petal 110 along a straight edge 111a that is disposed in generally parallel closely spaced relationship to the side 112a of the hole 112. The manner of attachment will vary with the specific application. Choices include rivets, screws, glue and the like. The outer contour of the flap 111 is generally arcuate or perhaps a section of an oval. The relationship between the petal 110 and the flap 111 is illustrated in FIGS. 14A and 14B. More specifically these Figures illustrate the relationship when no external forces are applied to the petal.

As illustrated in FIG. 15 the petal 112 will bend most along the edge 112a of the hole 112. This follows since the cross-sectional area of the petal to 110 is the smallest along that line 112a. This bending moves the flap 111 away from the hole 112. To allow a flow path C through the hole 112 as well as the flow path B past the free end of the petal 110.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. A reed member for use with an associated reed cage in an associated reed valve which comprises: a resilient flat member having a base end portion and a free end portion, said base end portion including means for mounting said member to associated structure, and said member has at least one arch shaped cut therein, said arch shaped cut including an arch part and first and second sides, each of said first and second sides having free ends and other ends, said other ends being joined by said arch part, said first and second sides being disposed in substantially perpendicular relationship to said base end portion with said arch part being disposed closer to said base end portion than said free ends of said first and second sides, the arch shaped cut defining a flap, said flap being dimensioned and configured for relative motion with respect to the rest of said member in response to fluid pressure.

2. The reed member as described in claim 1 wherein:
said member is elongated and said base end portion and said free end portion are disposed at ends thereof.

3. A reed member as described in claim 2 further including a plurality of petals.

4. The reed as described in claim 3 wherein:
said member has a plurality of additional generally arch shaped cuts disposed therein, each of said additional generally arch shaped cuts being oriented substantially the same way.

5. The reed as described in claim 4 wherein:
each of said arch shaped cuts has substantially the same dimensions and plurality of said cuts each have two ends that intersect a common imaginary line.

6. The apparatus as described in claim 5 wherein:

said member has a slot extending generally from said free end toward said base end intermediate adjacent arch shaped cuts whereby discrete petals are defined.

7. A reed valve apparatus which comprises:

a body having a first generally planar face having an elongated opening disposed in said body;

a reed having opposed first and second generally planar faces, each of said faces having first and second sides, said first generally planar face being disposed in the absence of external forces in face to face contact with said first generally planar face of said body, said reed being dimensioned and configured to overlap all of said opening in the absence of external forces;

said reed having a first edge portion by which the reed is attached to said body and an opposed second edge portion; and a generally arch shaped cut extending through said first and second faces of said reed, said arch shaped cut having an arch part having first and second ends and first and second elongated sides extending from said first and second ends, said reed including first and second hinges, said first hinge being a part of said reed intermediate said first elongated side of said arch shaped cut and said first side of said first face, said second hinge being a part of said reed intermediate said second elongated side of said arch shaped cut and said second side of said first face, an arch shaped portion being within said arch shaped cut within said reed that opens upon bending of said reed intermediate said first edge portion and said second edge portion, said arch shaped portion in said reed having (1) one face thereof exposed to the pressure within a combustion chamber and (2) a second face exposed to ambient air pressure when said reed is disposed against said body, said reed valve apparatus having only a single reed cooperating with said elongated opening.

said generally arch shaped cut has two ends and said two ends are closer to said second edge portion than the remainder of said generally arch shaped cut.

8. A reed valve apparatus as described in claim 7 wherein:

said reed has a plurality of additional generally arch shaped cuts disposed therein.

9. A reed valve apparatus as described in claim 8 wherein each of said plurality of generally arch shaped cuts has two ends and said two ends of each of said generally arch shaped cuts are disposed closer to said second edge portion than the remainder of the generally arch shaped cut.

10. A reed valve apparatus as described in claim 9 wherein:

each of said arch shaped cuts has substantially the same dimensions and all have two ends that intersect a common imaginary line.

11. A reed valve apparatus as described in claim 10 wherein:

said reed has a slot extending generally from said second edge portion toward said first edge portion intermediate adjacent arch shaped cuts whereby discrete petals are defined.

* * * * *